Patented Feb. 23, 1926.

1,574,116

UNITED STATES PATENT OFFICE.

HERMANN SCHÖPFER, OF GRAZ, STYRIA, AUSTRIA, ASSIGNOR TO FELICE BENSA, OF GENOVA, ITALY.

PROCESS FOR MANUFACTURING IMPROVED VAT DYES.

No Drawing.    Application filed April 9, 1925.    Serial No. 21,975.

*To all whom it may concern:*

Be it known that I, HERMANN SCHÖPFER, a citizen of the Republic of Austria, residing at Graz, Styria, Republic of Austria, have invented certain new and useful Improvements in Processes for Manufacturing Improved Vat Dyes, of which the following is a specification.

It was discovered that by heating nitroperylene with anhydrous aluminium chloride, dyes are obtained which can be readily brought in the form of a vat and which are remarkably fast.

The following is a description of two examples of carrying the present process into practice.

*Example I.*

One part by weight of dinitroperylene as obtained by treating in the cold perylene dissolved in tetrachloride of carbon with nitric acid of the density 1.2, is heated with 5 parts by weight of aluminium chloride under exclusion of moisture in any form for about four hours to a temperature of 160 to 200° centigrade.

The resulting molten mass is treated with dilute hydrochloric acid. The greenish black powder obtained is soluble in concentrated sulphuric acid with a reddish violet colour and is insoluble in the usual solvents having a comparatively low boiling temperature. It is readily soluble in the heat in nitrobenzol with a wine red colour, the vat is reddish violet, cotton is dyed olive brown.

*Example II.*

One part by weight of tetranitroperylene (Monatshefte fur Chemie vol. 40, page 407) is treated with five parts of aluminium chloride as described in Example I.

The black powder thus obtained is soluble in concentrated sulphuric acid with a reddish violet colour; it is readily soluble in glacial acetic acid and nitrobenzol in the heat with an olive green colour and in aniline with a brown colour; the vat is purple coloured, cotton is dyed olive green.

The product is in any case a condensated nitroperylene.

What is claimed is:

1. A process for manufacturing vat dyes consisting in that nitro derivatives of perylene are heated with aluminium chloride.

2. As a new product of manufacture, a vat dye prepared by condensing nitro derivatives of perylene by heating them with aluminium chloride.

In testimony whereof I have affixed my signature.

HERMANN SCHÖPFER.